Patented Jan. 1, 1924.

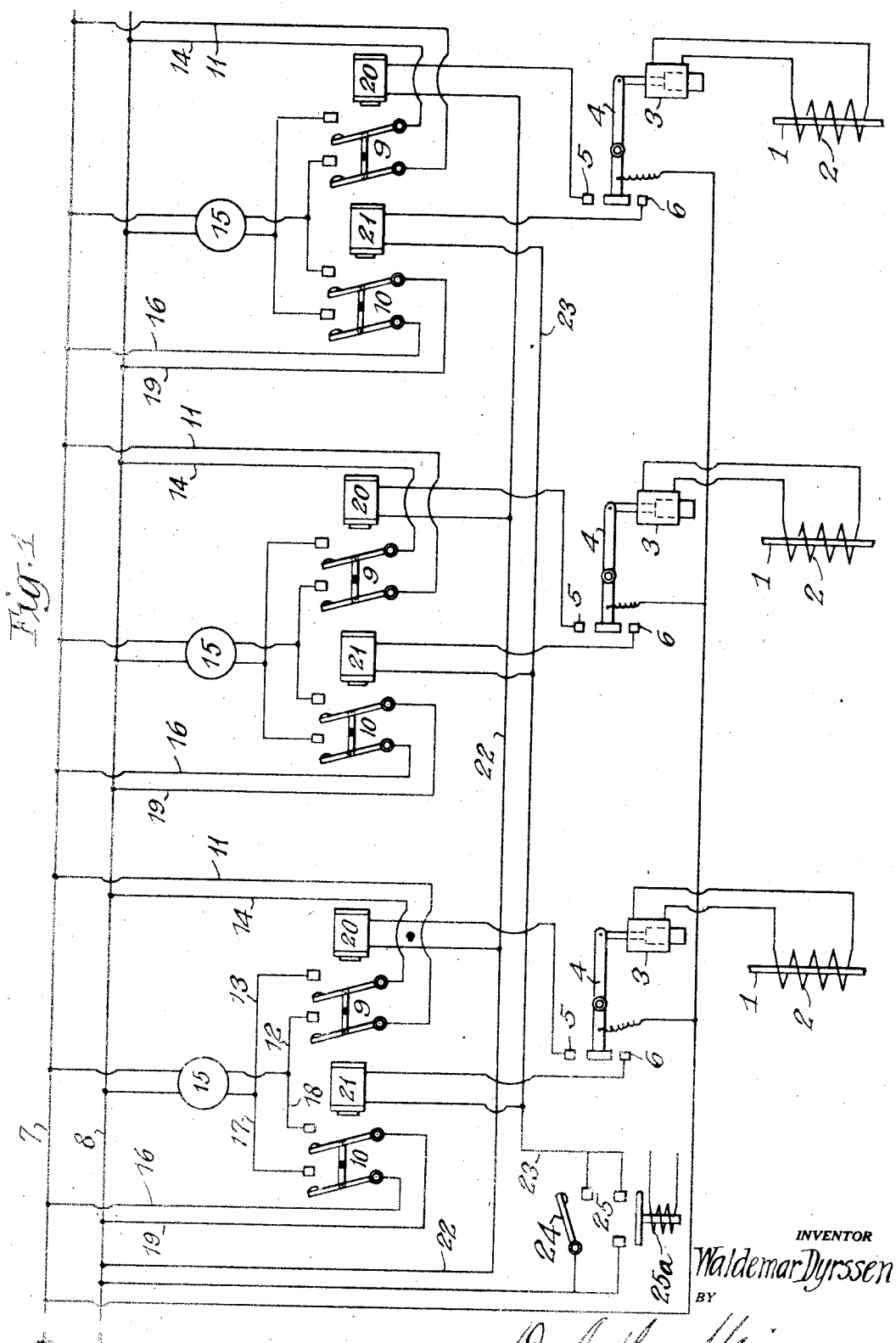

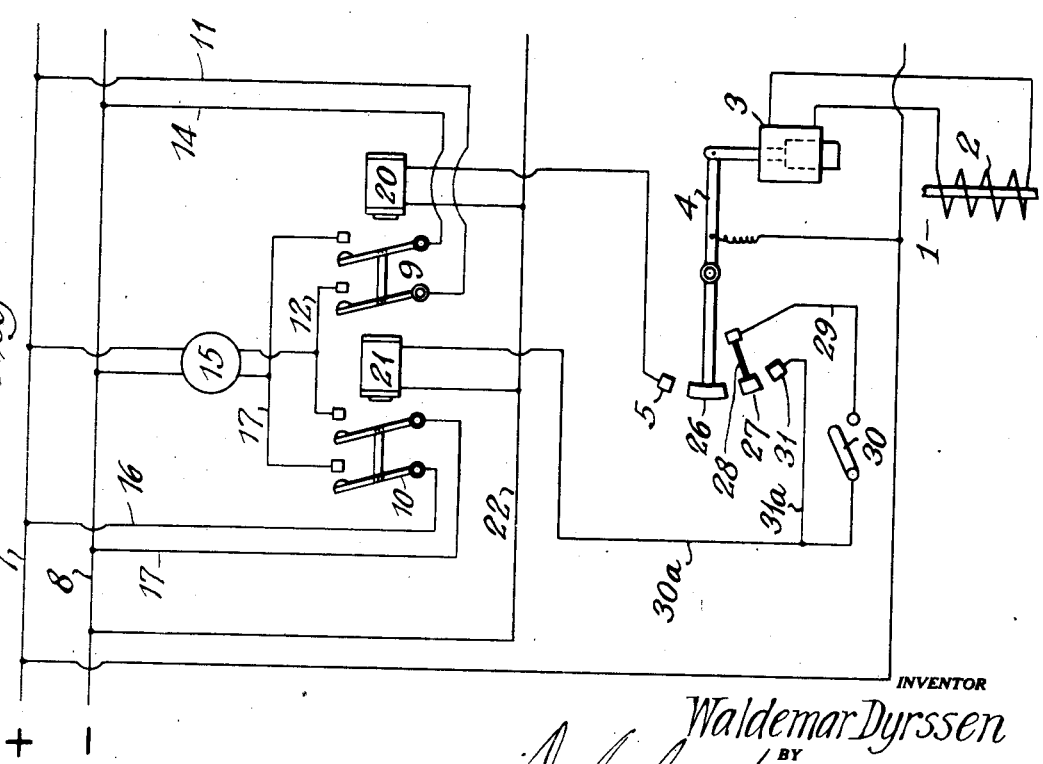

1,479,429

UNITED STATES PATENT OFFICE.

WALDEMAR DYRSSEN, OF NEW YORK, N. Y.

REGULATION OF ELECTRIC FURNACES.

Application filed January 12, 1921. Serial No. 436,634.

*To all whom it may concern:*

Be it known that I, WALDEMAR DYRSSEN, a subject of the King of Sweden, and resident of the city, county, and State of New York, have invented certain new and useful Improvements in Regulation of Electric Furnaces, of which the following is a specification.

This invention relates to means for controlling the movements of the electrodes in electric furnaces. It provides means whereby the movement of the electrodes may be prevented in either direction as desired. Systems has heretofore been used for automatically moving the electrodes up and down to vary the length of the arc in melting down and finishing the charge in the furnace, but these arrangements have been somewhat unsatisfactory due to the fact that during the first stages of melting down the scrap the electrodes move up and down much oftener than is necessary or desirable, causing great variations in the electrode current. This reduces the power input and causes severe strains on the whole electrical equipment. This disadvantage of the electrode "hunting" up and down is most noticeable at the beginning in melting down a charge of scrap. During this period the scrap melted by the electrode runs into the rest of the charge and solidfies. The result is that a hole is formed around the electrode and, therefore, the electrode moves mostly down. When the charge beneath the tip of the electrode becomes molten the downward motion of the electrode stops. I have concluded, therefore, that during the period of melting down the scrap, the upward movement of the electrode is quite unnecessary and in fact, is a decidedly objectionable feature of such automatic regulating devices as heretofore used.

My invention provides means for preventing this unnecessary up and down motion or "hunting" of the electrode during this period.

The invention is illustrated digrammatically in the accompanying drawings in which Fig. 1 shows the diagrammatic connections for an electric furnace having three electrodes;

Figs. 2 and 3 show alternative circuit arrangements for operating one of the electrodes of a furnace, it being understood that these figures illustrate the principle upon which any number of electrodes may be similarly operated.

Referring first to Fig. 1, numerals 1 represent the leads which connect with and supply current to the several electrodes and 2 are transformers which co-operate with the leads 1 to supply current to the coils 3 of contact-making ammeters. The coils 3 of said ammeters actuate levers 4 adapted to make a circuit with either of the contacts 5 or 6. Current for the motors 15 is supplied from the feed wires 7 and 8. The contacts 5 are connected to magnets 20 and are arranged to actuate double-pole switches 9 and the contacts 6 are connected to similar magnets 21 arranged to actuate double-pole switches 10. The switches 9 close a circuit to rotate the motor 15 in one direction through the wires 7, 11, 12, 13, 14 and 8. When the magnet 21 is energized it actuates the switch 10 and closes a different circuit through the motor 15 through wires 7, 16, 17, 18, 19 and 8 to rotate the motors in the opposite direction. The motors 15 are connected by suitable means, not shown, to the electrodes of the furnace, and with the circuits just described it is clear that this arrangement will permit the motors to either raise or lower the electrodes in the furnace.

The magnets 20 are connected to the feed wire 8 by a lead 22 as shown. The magnets 21 are connected by a wire 23 to a knife switch 24 and a contact-making overload relay 25 both of which are connected to the feed wire 8.

When levers 4 of the contact-making ammeter make contact at 5, current goes through coil 20 and switches 9 close and the electrode motors 15 start the electrodes downward. If lever 4 makes contact with 6, current goes through coil 21, but only in case knife switch is closed, and switch 10 is closed, starting the motor for upward motion of the electrode. If, however, switch 24 is open, no current can pass through the coils 21 and the upward motion of the electrodes in such case is cut out. In the first period of the melting down process, I, therefore, leave switch 24 open, thus preventing "hunting" of the electrode. I have found that the arcs are very well maintained and that extended short circuits between the scrap and an electrode do not occur. Such short circuits are very undesirable as they destroy contacts in other parts of the charge, which may in such case become "isolated", that is, current cannot be made to pass through the charge, except with special arrangements.

In case, however, that a heavy sustained overload should occur during this period, it is advisable to provide the overload relay 25, which closes the circuit to magnets 21. This relay is actuated by the coil 25ª which receives an induced current from the electrode circuit and so arranged that it closes for a heavy sustained overload on any one electrode or phase. This relay acts, therefore, as a safety when switch 24 is open. This relay is not absolutely necessary, but I prefer to use it as a safety device.

When the first melting period is over or when the downward motion of the electrodes stops, I close switch 24 and the electrodes can adjust themselves in any direction, the switches 9 and 10 being actuated automatically as will be understood from the above description.

Instead of having one switch 24, for all three electrodes, I can use individual switches in the circuit to each of the magnets 21. I can also arrange the switches in any of the leads, 16, 17, 18 or 19, or in any other part of the circuits which accomplishes the same result, that is the cutting out of the up motion of the electrodes.

A modified arrangement, Fig. 2, shows a regulating device for one electrode. The numerals 1 to 5 and 9 to 22 indicate the same parts as shown in Fig. 1. In this figure the lever 4 is provided with a blade 26 adapted to co-act with a contact 27 in its downward movement. This contact is yieldingly mounted on a spring 28 and connected by a wire 29 to a switch 30 which switch is connected by a wire 30ª leading to the magnet 21. Below the contact 27 is another contact 31 connected by a wire 31ª to the wire 30ª leading to the magnet 21. When the contact 27 is pushed with sufficient force by the lever 4 it will connect with the contact 31. In using this arrangement during the first period of the melting down process the switch 30 is left open. A small overload on the electrodes will cause the coil 3 to make contact between points 26 and 27 but the motor will not be rotated to lift the electrode as the circuit is broken at 30. But, if the overload is a heavy one, the lever 4 is swung down with sufficient force to overcome the tension of the spring 28 and contact 27 engages the contact 31 which closes the circuit through coil 21 which in turn operates the double-pole switch 10 to close a circuit through the motor which will cause the electrode to be lifted. The contact 31 performs substantially the same function as the overload relay 25 shown and described in connection with Fig. 1. By careful adjustment of the distances between the contacts 5, 26, 27, and 31, and providing a spring 28 of determined elasticity, this arrangement will effectively prevent the "hunting" of electrodes.

In the arrangement shown in Fig. 3, the circuit for magnet 20 is controlled by contacts 32 and 33 leading respectively to the feed wire 7 and magnet 20. The circuit of magnet 21 is controlled by contacts 34 and 35 carried on yielding fingers 36 and 37. The contact 35 is connected by a wire 38 to the magnet 21 and the contact 34 is connected by a wire 39 to a wire 40 in which is interposed a switch 41 for breaking the circuit to the magnet 21 to prevent the upward movement of the electrode during the melting down operation. A fixed contact 42 connected by wires 43 and 44 to the wire 40 is provided to complete a circuit to the feed wire 7 and through the magnet 21 when a heavy surge of current or overload flows through the electrode. When such a surge of current passes through the electrode, the core 45 of a solenoid 46 will be lifted and cause the contact plate 47 to engage contacts 34 and 35 and force them upwardly into engagement with the fixed contact 42 and thereby close the circuit from the magnet 21 through wires 38, 43 and 44 to the wire 40 and thence by wire 48 to the feed wire 7 which action will operate the switch 10 and cause the motor 15 to lift the electrode.

The arrangement shown in Fig. 3 is repeated for each of the other electrodes, the wires 40 and 44 continuing to the right and having branches leading to automatic switching mechanisms the same as in Fig. 3; there being, however, but the one hand switch 41 in the entire length of the wire 40. When this hand switch is closed, therefore, the current may pass through contact 34 to contact 35 through the plate 47 to feed the electrode down under normal operation. When the hand switch 41 is opened, the wire 40 for the three electrodes is broken and the circuit can not be completed except through the by-pass wire 44. This wire 44 will be connected to the wire 40, through the plate 42 and wire 43 of any one of the electrodes, whenever there is a surge on the circuit of that electrode sufficient to press the contact 34 up into engagement with the plate 42. Thus a surge in the circuit of any one electrode will put the circuits of the other electrodes in such a position that they will be lifted by the ordinary variation of the current sufficient to bring their plates 47 into contact with terminals 34 and 37. That is to say a surge on any one of the electrodes sufficient to make contact through its plate 42 will have the same effect as the closing of the hand switch 41 during the period of such a surge.

While I have described means for preventing the lifting movement of the electrodes, it is of course manifest that if desirable I may use the same or equivalent means to prevent the downward movement of the electrode without departing from the invention as defined in the appended claims.

What I claim is:

1. In combination with automatic regulating devices for moving the electrodes of an electric furnace, manually controlled means for preventing the automatic devices from effecting the upward movement of the electrodes.

2. In combination with automatic regulating devices for moving the electrodes of an electric furnace, manually controlled means for preventing the upward movement of the electrodes during the period the scrap is being melted down in the furnace.

3. In combination with automatic regulating devices for moving the electrodes of an electric furnace, manually controlled means for preventing the upward movement of the electrodes during the period the scrap is being melted, and means for automatically effecting such upward movement during said period when heavy overloads or surges of current pass through the electrodes.

4. In combination with automatic regulating devices for moving an electrode of an electric furnace, means for rendering one of said regulating devices ineffective during the initial melting of the scrap to prevent the upward movement of the electrode, and means actuated by the electrode current for rendering said last named regulating device effective to produce such upward movement when heavy overloads or surges of current pass through the electrode.

5. An apparatus for controlling the movement of electrodes in an electric furnace, a motor for moving the electrodes, separate circuits controlling the upward and downward movement of said motors, magnets controlled by the current flowing to the electrodes for closing one or the other of said circuits and a manually operated switch for breaking the circuit of one of said magnets to prevent the movement of the electrodes in one direction during a desired stage of the melting process.

6. An apparatus for controlling the movement of electrodes in an electric furnace, a motor for moving the electrodes, separate circuits controlling the upward and downward movement of said motors, magnets controlled by the current flowing to the electrodes for closing one or the other of said circuits and a switch for breaking the circuit of one of said magnets to prevent the movement of the electrode in one direction and a switch actuated by current flowing to the electrode arranged to close the last named circuit when a heavy surge or overload of current flows through the electrode.

7. An apparatus for controlling the movement of electrodes in an electric furnace including a motor for moving the electrodes, separate circuits for controlling the direction of rotation of said motors, switches in said circuits and magnets for actuating said switches, circuits for said magnets, means controlled by the current flowing to the electrodes for making and breaking said magnet circuits and a manually operated switch for breaking one of said magnet circuits to prevent the upward movement of the electrode by said motor during the time the scrap in the furnace is being melted down.

8. An apparatus for controlling the movement of electrodes in an electric furnace including a motor for moving the electrodes, separate circuits for controlling the direction of rotation of said motors, switches in said circuits and magnets for actuating said switches, circuits for said magnets, means controlled by the current flowing to the electrodes for making and breaking said magnet circuits and a switch for breaking one of said magnet circuits to prevent the upward movement of the electrode by said motor and an overload relay connected across the contacts of said switch and arranged to close the circuits across the open switch contacts when a heavy surge or overload flows through the electrodes.

9. The method of operating an electric metallurgical furnace which consists in automatically controlling only the lowering movement of the electrodes during the melting down period and in automatically controlling both the lowering and lifting movements of the electrodes during the refining period.

10. The method of making and treating steel in an electric metallurgical furnace which consists in automatically feeding the electrodes only toward the charge on the hearth of the furnace during the initial melting down period and in automatically controlling the movements of the electrodes toward and away from the charge during the refining period.

In witness whereof, I have hereunto signed my name.

WALDEMAR DYRSSEN.